Figure 1:
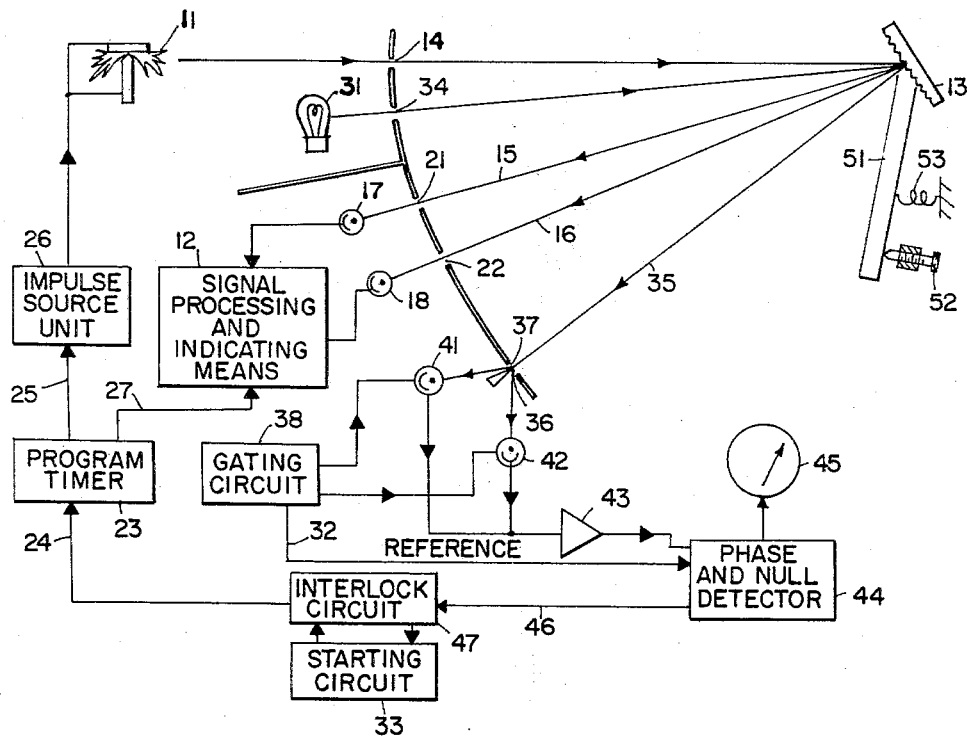

Jan. 18, 1966     P. C. HUTCHINSON ETAL     3,229,566

SPECTROSCOPIC ALIGNMENT MONITOR

Filed Nov. 24, 1961

INVENTORS
PAUL C. HUTCHINSON
HENRY J. LEVESQUE
BY
*Ezekiel Wolf, Wolf & Greenfield*
ATTORNEYS

United States Patent Office 3,229,566
Patented Jan. 18, 1966

3,229,566
SPECTROSCOPIC ALIGNMENT MONITOR
Paul C. Hutchinson, Lexington, and Henry J. Levesque, Topsfield, Mass., assignors, by mesne assignments, to Consolidated Electrodynamics Corporation, Pasadena, Calif., a corporation of California
Filed Nov. 24, 1961, Ser. No. 154,800
2 Claims. (Cl. 88—14)

The present invention relates in general to spectroscopy and more particularly concerns precision spectroscopic apparatus for providing accurate qualitative and quantitative analysis of a substance while insuring that measurements are made only when the apparatus is in precise alignment. Insuring precise alignment is readily accomplished with relatively low-cost reliably operating equipment which automatically and continuously monitors alignment and automatically prevents the spectrographic apparatus from making a measurement when alignment is improper.

In a typical spectrochemical analyzer, means are provided for exciting a sample to be analyzed so that it produces radiant energy characterized by a spectrum representative of the composition of the sample. This radiant energy is directed upon a diffraction grating through an entrance slit. The diffraction grating disperses the incident energy into a number of spaced spectral lines disposed upon a focal surface where the image of the entrance slit is focused. An exit slit is provided on the focal surface for each spectral line of interest, the displacement between the entrance slit and an exit slit being related to the wavelength of the dispersed energy embraced by a respective exit slit. Detecting means, such as photocells, respond to the energy transmitted through each exit slit to provide an indication of the intensity of the related dispersed spectral line and consequently the quantity of the substance whose presence is indicated by that spectral line.

Resolution capabilities are increased if the pathlength between entrance slit and exit slits via the diffraction grating is increased. Increasing this pathlength introduces a problem of maintaining precise absolute mechanical alignment among the different slits and the diffraction grating. Precise alignment is required to establish coincidence between each dispersed spectral line of interest and its associated exit slit, for even a slight relative angular displacement between the diffraction grating and the focal surface embracing the slits will cause misalignment serious enough to prevent accurate measurements.

One approach to the solution of this problem practiced in the prior art employs a source of radiant energy of known wavelength directed upon the diffraction grating through a reference entrance slit and dispersed by the diffraction grating to a known position on the focal surface when the apparatus is in correct alignment. A servo system continuously controls the relative orientation between diffraction grating and focal surface to maintain the dispersed reference spectral line in a predetermined position on the focal surface.

While that system, when performing normally, represents a solution to the problem, it has a number of disadvantages. The required servo system is costly, bulky, consumes considerable power and is subject to malfunctioning.

It is known that, as a practical matter, high resolution precision apparatus may be adjusted only once and remain in precise alignment sufficiently long to make measurements without readjustment. Thus, continuous servoing to maintain precise alignment is unnecessary and inherently inefficient. One difficulty with prior art manually aligned systems is that the operator must consciously check for misalignment. If he forgets to check before making a measurement or misalignment develops during a measurement period, the results of the measurement are unreliable.

Accordingly, it is an important object of the present invention to provide relatively low-cost yet precise spectroscopic apparatus which provides measurements only when in precise alignment while eliminating the disadvantages enumerated above in connection with a prior art continuous servoing or manually aligned system.

It is another object of the invention to achieve the preceding object reliably with relatively low-cost apparatus.

It is still another object of the invention to achieve the preceding objects with a minimum of attention from an operator of the apparatus.

According to the invention, the position of a reference spectral line upon a focal surface is continuously monitored. If this reference spectral line exhibits more than a predetermined deviation from a prescribed normal position, the spectroscopic measuring apparatus is disabled until the apparatus is realigned so that the reference spectral line assumes its normal position indicating alignment. Means are provided for representing the degree of misalignment, and means are provided for controlling the degree of misalignment so that the reference spectral line may be returned to its normal position on the focal surface. A feature of the invention resides in start means actuated by an operator which activates the apparatus only on the condition that the reference spectral line is in its normal position. If the reference spectral line is not in its normal position, returning the spectral line to its normal position automatically enables the spectroscopic apparatus.

In accordance with the method of the invention, the operator observes diablement of the apparatus upon misalignment and manually realigns the apparatus while observing an indication of the degree of misalignment so as to reduce the indicated degree of misalignment until the reference spectral line is indicated as being in its normal position.

Figure 2:
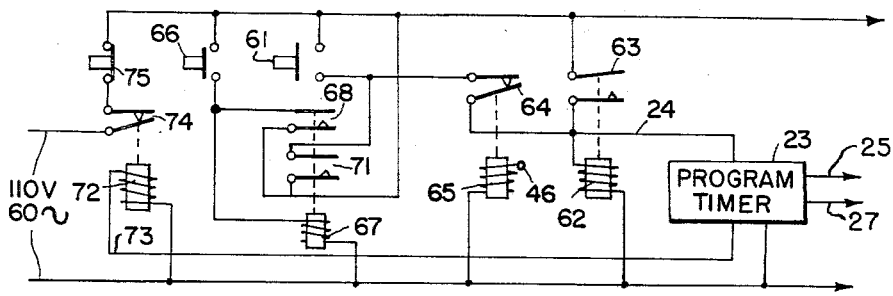

Numerous other features, objects and advantages of the invention will become apparent from the following specification when read in connection with the accompanying drawing, in which:

FIG. 1 is a combined block-pictorial diagram of a system according to the invention; and FIG. 2 is a schematic circuit diagram of a switching circuit suitable for providing certain starting and interlocking functions according to the invention.

With reference now to the drawing and more particularly FIG. 1 thereof, there is shown a combined block-pictorial representation of a system according to the invention in which a sample excited by an arc discharge between electrodes 11 emits characteristic radiation indicative of its composition indicated by the signal processing and indicating means 12. The radiant energy characteristic of the excited sample is incident upon diffraction grating 13 through entrance slit 14 and is dispersed into angularly displaced spectral rays, such as 15 and 16 corresponding to spectral lines of the incident radiant energy. The rays 15 and 16 are incident upon photocells 17 and 17, respectively, through exit slits 21 and 22, respectively. Photocells 17 and 18 deliver electrical signals to signal processing and indicating means 12 representative of the energy in each dispersed spectral line ray, the latter apparatus providing an indication of this energy which in turn represents the amount of different elements present in the excited sample.

When program timer 23 receives an activating signal on line 24, a measurement is initiated by delivering a signal on line 25 to impulse source unit 26 to develop an electrical arc discharge across electrodes 11 and thereby excite the sample. Program timer 23 also delivers appropriate signals to signal processing and indicating means 12 for timing the different signal processing and indicating operations. Since a number of techniques for carrying out these measurements are well-known in the spectrometer art, details of the program timer, impulse source unit and signal processing and indicating means are not shown so as to avoid obscuring the principles of the invention.

A source 31 of radiant energy of known wavelength, such as a mercury or neon lamp may emit energy of reference wavelength continuously. Energy of this known reference wavelength from source 31 is incident upon diffraction grating 13 through reference entrance slit 34 where it is dispersed along the path 35 and strikes the knife edge of the wedge-shaped mirror 36 located at the center of the reference exit slit 37 when the system is in proper alignment.

A system according to the invention preferably employs a monitoring system which remains operative during the course of making measurements. To this end separate entrance and exit slits are provided in the path of energy from the reference source 31 so that the measuring system may still indicate the presence and amount of the same element producing radiation of reference wavelength, the dispersed line of that wavelength from the excited source being imaged on an exit slit spaced from the reference exit slit 37. Continuous monitoring may also be effected by directing energy from reference source 31 through entrance slit 14 having a wavelength different from that present in any of the samples interested in being analyzed. As still another alternative, the last-described arrangement may include means for disabling the reference source 31 while measurements are being taken when the excited sample interested in being analyzed produces radiation of reference wavelength.

The monitoring system comprising gating circuit 38, reference photocells 41 and 42, amplifier 43, phase and null detector 44 and indicating meter 45 may also be operative continuously. With ray 35 oriented in the normal position as shown centered in reference exit slit 37, photocells 41 and 42 receive equal intensity radiant energy. Gating circuit 38 controls the outputs from photocells 41 and 42 so that output signals representative of incident energy intensity are electrically mixed and delivered to the input of amplifier 43 during alternate mutually exclusive intervals which may correspond to positive and negative half cycles of the reference signal on line 32. When the output from the reference photocells 41 and 42 are substantially equal, no output signal is produced by phase and null detector 44, and center-zero indicating meter 45 is centered to indicate proper alignment. In this condition, phase and null detector 44 does not generate a misalignment signal on line 46, and start circuit 33 can initiate a measurement operation by delivering a start signal through interlock circuit 47 to program timer 23 on line 24.

If ray 35 is displaced from the center of exit slit 37, one of reference photocells 41 and 42 receives more energy than the other to develop an A.-C. signal at the input of amplifier 43 having an amplitude representative of the degree of displacement from the center of the exit slit and a phase representative of the sense of the displacement with respect to the reference signal on line 32. Both the sense and magnitude of the A.-C. signal are sensed by phase and null detector 44 and indicated on meter 45 by an appropriate deviation to the left or right of center. Since such phase and null detectors are well-known in the electrical arts, details thereof are not shown.

When phase and null detector 44 senses a displacement of the reference spectral line from the center of exit slit 37, the phase and null detector generates a misalignment signal on line 46 which actuates interlock circuit 47 and prevents a start signal from being transmitted from start circuit 33 to program timer 23 along line 24. Before a measurement operation can be commenced, it is then necessary to re-align the spectroscopic instrument as described below.

Diffraction grating 13 is pivotally mounted and rotatable about its pivot axis upon movement of lever arm 51 held against the tip of adjusting screw 52 by a spring 53. The operator observes meter 45 and rotates adjusting screw 52 so as to bring the metering needle to the center position. When the reference spectral line is centered in exit slit 37, phase and null detector 44 senses normal position and no longer generates a misalignment signal on line 46, permitting interlock circuit 47 to pass a start signal from starting circuit 33 to program timer 23 on line 24.

By positioning the exit slits 21 and 22 so that the spectral lines of interest are focused thereon when the reference spectral line is centered in reference exit slit 37, precise alignment of the system is continuously monitored and any deviation therefrom automatically prevents operation of the instrument. Only after the system is returned to alignment can a measurement be initiated. Thus, the effects of human errors and required skills are minimized while at the same time eliminating costly electromechanical servo systems without any sacrifice in the accuracy of measurements actually provided.

Referring to FIG. 2, there is shown a schematic circuit diagram of a representative arrangement of interlock circuit 47 and start circuit 33 of FIG. 1. The operator initiates automatic operation of the system by depressing start button 61. Pushing this button energizes relay 62 through normally closed contacts 64 which in turn closes holding contact 63 to keep this relay energized. This operation also delivers energy to program timer 23 on line 24 through normally closed contacts 64 of normally de-energized relay 65.

The function of relay 62 is to provide continuous energy to the program timer through contacts 63 once a measurement operation has been commenced. The short-term alignment stability of spectroscopic instruments is quite good, and any misalignment which might develop during the relatively short period of a measurement operation is so slight that accuracy is not appreciably affected. Thus once a measurement operation has been started with the system initially in alignment and contacts 64 therefore closed, the operation will continue to completion even though a misalignment sufficient to energize relay 65 and open contacts 64 may develop during that measurement.

Relay 65 is normally de-energized as shown with the spectrum in proper alignment and reference spectral lines centered on exit slit 37 causing null detector 44 to deliver no energy on line 46. If the spectrum is not in register, line 46 carries a signal which energizes relay 65, thereby preventing relay 62 from receiving the necessary energy to keep holding contacts 63 closed.

Alternately, a start readiness condition may be established by depressing start button 66 to energize relay 67 and close holding contacts 68 and contacts 71. Since the latter contacts are connected across the terminals closed by start switch 61, relay 67 performs the function of holding start button 61 in. If the spectrum is in register, the sequence of steps described above will again occur and automatic measurements start. If the spectrum is not in register, the instrument will be in a "start readiness" condition. The operator may then operate knob 52 to adjust the position of the grating until the spectrum falls into register, causing relay 65 to become de-energized and close contact 64 and automatically initiate a measurement operation.

Relay 72 may receive a momentary signal from program timer 23 on line 73 at the completion of a measurement cycle to open the normally closed contacts 74 and disable the apparatus. This momentary opening of contacts 74 causes relay 62 to drop out, opening holding contacts 63 and preventing further delivery of energy to the program timer. If relay 67 was previously energized, it will also drop out and open holding contacts 68 when relay 72 is momentarily energized. The relays are thus restored to their initial condition in preparation for the next measurement operation. An emergency stop button 75 may be provided should it become necessary to immediately disable the system.

There has been described a precision spectroscopic analyzing system arranged to make measurements only when in precise alignment without costly electromechanical servo mechanisms subject to being in disrepair. Yet, operation and alignment is so simple that accurate measurements may be made by one having a minimum of skill.

It is evident that those skilled in the art may now make numerous modifications of and departures from the specific embodiments described herein without departing from the inventive concepts. Consequently, the invention is to be construed as limited only by the spirit and scope of the appended claims.

What is claimed is:

1. In a spectroscopic instrument having an entrance slit, dispersing means for converting radiation admitted through the entrance slit from an excited sample into spectral lines characteristic of the sample composition, exit slits in known relation to the entrance slit for admitting to a measuring system selected spectral lines transmitted from the dispersing means, the dispersing means having a desired geometric relation to the sample radiation entrance and exit slits, and program means to initiate a measurement cycle; an alignment monitor apparatus comprising:

a source of monitor radiation, a monitor entrance slit, the montior radiation being directed to the dispersing means through the monitor entrance slit, a monitor exit slit spaced in known relation to the monitor and sample radiation entrance slits, the monitor exit slit being positioned to intercept centrally a selected spectral line of the monitor radiation spectrum transmitted from the dispersing means when the dispersing means is in the desired geometric relation;

positioning means to adjust the position of the dispersing means to the desired geometric relation;

photoelectric means to detect a deviation of the selected monitor spectral line from central interception by the monitor exit slit, and electric means interconnected with the photoelectric means to generate a signal indicative of said deviation; and disabling means interconnected with the electric means and program means to prevent initiation of a measurement cycle by the program means when the electric means signal indicates non-central interception by the monitor exit slit of the selected monitor spectral line.

2. In a spectroscopic instrument having an entrance slit, dispersing means for converting radiation admitted through the entrance slit from an excited sample into spectral lines characteristic of the sample composition, exit slits in known relation to the entrance slit for admitting to a measuring system selected spectral lines transmitted from the dispersing means, the dispersing means having a desired geometric relation to the sample radiation entrance and exit slits, and program means to initiate a measurement cycle; an alignment monitor apparatus comprising:

a source of monitor radiation, a monitor entrance slit, the monitor radiation being directed to the dispersing means through the monitor entrance slit, a monitor exit slit spaced in known relation to the monitor and sample radiation entrance slits, the monitor exit slit being positioned to intercept centrally a selected spectral line of the monitor radiation spectrum transmitted from the dispersing means when the dispersing means is in the desired geometric relation;

manual positioning means to adjust the position of the dispersing means to the desired geometric relation;

photoelectric means to detect the amount and direction of a deviation of the selected monitor spectral line from central interception by the monitor exit slit, and electric means interconnected with the photoelectric means to generate and visually display a signal proportional to amount and direction of said deviation; and disabling means interconnected with the electric means and program means to prevent initiation of a measurement cycle by the program means when the electric means signal indicates non-central interception by the monitor exit slit of the selected monitor spectral line.

References Cited by the Examiner

UNITED STATES PATENTS

| | | | |
|---|---|---|---|
| 2,140,355 | 12/1938 | Gulliksen | 250—214 |
| 2,764,909 | 10/1956 | Caldecourt et al. | 88—14 |
| 2,833,474 | 5/1958 | Wilson et al. | 235—61.11 |
| 2,837,959 | 6/1958 | Saunderson et al. | 88—14 |
| 2,850,684 | 9/1958 | Klein et al. | 317—153 |
| 2,937,561 | 5/1960 | Saunderson et al. | 88—14 |
| 2,981,869 | 5/1961 | Balint | 317—154 X |
| 3,064,520 | 11/1962 | Saunderson et al. | 88—14 |

JEWELL H. PEDERSEN, *Primary Examiner.*